US008225808B2

(12) United States Patent
Mallookis et al.

(10) Patent No.: US 8,225,808 B2
(45) Date of Patent: *Jul. 24, 2012

(54) COLLAPSIBLE TRUSS ASSEMBLY

(75) Inventors: Steven E. Mallookis, Littleton, CO (US); Steven B. Mallookis, Littleton, CO (US)

(73) Assignee: Go Papa, LLC., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/845,277

(22) Filed: Jul. 28, 2010

(65) Prior Publication Data

US 2010/0317498 A1 Dec. 16, 2010

Related U.S. Application Data

(63) Continuation of application No. 12/019,441, filed on Jan. 24, 2008, now Pat. No. 7,789,099.

(51) Int. Cl.
*E04H 15/50* (2006.01)

(52) U.S. Cl. ..... 135/145; 135/121; 135/131; 135/120.3; 403/174; 403/217; 403/298; 248/229.25; 248/277.1

(58) Field of Classification Search .......... 135/130–131, 135/143–146, 121–122, 151, 120.3, 909; 248/228.6, 229.25, 229.2, 277.1; 403/170–174, 403/217, 292, 296, 298; 297/16.2, 45, 106; 5/115; 160/84.09, 84.11; 211/105, 202
See application file for complete search history.

(56) References Cited

U.S. PATENT DOCUMENTS

| 3,165,110 | A | * | 1/1965 | Brooks | 135/124 |
|---|---|---|---|---|---|
| 4,125,249 | A | * | 11/1978 | Zen | 256/67 |
| 4,691,818 | A | * | 9/1987 | Weber | 198/666 |
| 4,714,370 | A | * | 12/1987 | Chen | 403/217 |
| 5,078,534 | A | | 1/1992 | White | |
| 5,131,783 | A | * | 7/1992 | Astl | 403/298 |
| 5,203,135 | A | * | 4/1993 | Bastian | 52/848 |
| 5,244,001 | A | | 9/1993 | Lynch | |
| 5,275,188 | A | | 1/1994 | Tsai | |
| 5,358,220 | A | | 10/1994 | Yu-Kuang | |
| 5,490,532 | A | | 2/1996 | Mallookis et al. | |
| 5,632,293 | A | | 5/1997 | Carter | |
| 5,701,713 | A | | 12/1997 | Silver | |
| 5,701,923 | A | | 12/1997 | Losi, Jr. et al. | |
| 5,921,260 | A | | 7/1999 | Carter | |
| D427,895 | S | * | 7/2000 | Morton | D8/382 |

(Continued)

FOREIGN PATENT DOCUMENTS

WO 2007064113 6/2007

*Primary Examiner* — Winnie Yip
(74) *Attorney, Agent, or Firm* — Brooks, Cameron & Huebsch PLLC.

(57) ABSTRACT

A collapsible truss assembly is described herein. One component includes a layered u-bracket including a first u-bracket connected to the collapsible truss assembly, having a first channel, a first surface opposing the channel, and a first aperture that spans from the first surface to the first channel and is of a particular diameter. The layered u-bracket also includes a second u-bracket having a second channel, a second surface opposing the second channel, and a second aperture that spans from the second surface to the second channel and is of the particular diameter. For the layered u-bracket, the second channel is flush with the first surface, and the first and second apertures are aligned.

12 Claims, 15 Drawing Sheets

U.S. PATENT DOCUMENTS

| | | |
|---|---|---|
| 6,302,486 B1 | 10/2001 | Lamart et al. |
| 6,423,895 B1 | 7/2002 | Murphy et al. |
| 6,431,193 B2 | 8/2002 | Carter |
| 6,675,545 B2 * | 1/2004 | Chen et al. .................. 52/586.1 |
| 6,709,187 B2 | 3/2004 | Loh |
| 7,044,146 B2 | 5/2006 | Losi, Jr. |
| 7,337,731 B2 | 3/2008 | Mu et al. |
| 7,360,549 B2 | 4/2008 | Seo |
| 7,364,445 B1 * | 4/2008 | Ni et al. ....................... 439/140 |
| 7,374,237 B2 | 5/2008 | Park et al. |
| 7,428,908 B2 | 9/2008 | Seo |
| 7,449,635 B2 | 11/2008 | Wiant |
| 7,789,099 B2 | 9/2010 | Mallookis et al. |
| 7,918,891 B1 * | 4/2011 | Curran et al. .............. 623/17.16 |
| 2004/0084074 A1 | 5/2004 | Chiu et al. |
| 2006/0096631 A1 | 5/2006 | Mallookis et al. |
| 2006/0130887 A1 | 6/2006 | Mallookis et al. |
| 2007/0221263 A1 | 9/2007 | Tai |
| 2008/0191497 A1 | 8/2008 | Mayo et al. |
| 2009/0056776 A1 * | 3/2009 | Ma ................................. 135/29 |

* cited by examiner

COLLAPSIBLE TRUSS ASSEMBLY

PRIORITY INFORMATION

This application is a continuation of U.S. application Ser. No. 12/019,441, filed Jan. 24, 2008, the specification of which is incorporated herein by reference.

BACKGROUND

Portable collapsible shelters, e.g., folding canopies, can be designed for ease of transport, setup, and takedown. Such shelters can be useful for outdoor gatherings, temporary military posts, emergency cover, even indoor conferences or trade shows to provide a sense distinction from other exhibits, among other uses.

Portable collapsible shelters can include accordion-type collapsible truss assemblies between supporting legs of the shelter. According-type collapsible truss assemblies can include a number of truss members interconnected at pivotal x-joints near truss member midpoints and at pivotal v-joints near truss member endpoints. The truss members may be connected at one endpoint to a portion of a shelter leg, e.g., at a slidable or fixed mounting bracket, and at another endpoint to another truss member at a pivotal v-joint. Thus, the accordion-type collapsible truss assembly can be expanded and collapsed to allow for ease of transport, setup, and takedown.

Truss assemblies for portable collapsible shelters were initially composed of thick walled steel tubing. In the push for lighter weight and ease of portability, some manufacturers have used lower strength materials, e.g., aluminum. However, aluminum is typically more expensive and weaker than steel. As a result of the desire to limit weight and cost, some manufacturers have also used thin walled truss members in portable collapsible assemblies.

The use of lighter weight, lower strength materials in collapsible truss assemblies has led to deformation and failure of truss members, particularly near pivotal x-joints. Such deformation can be caused, at least in part, by user abuse in forcing the operation of setup and takedown, or weather related axial bending stresses, among other causes. Due to the nature of some designs of the collapsible truss assembly, loading can centralize near the midpoint of truss members at the pivotal x-joints, potentially leading to the above-described defects.

DETAILED DESCRIPTION

A collapsible truss assembly is described herein. One embodiment includes a layered u-bracket including a first u-bracket connected to the collapsible truss assembly, having a first channel, a first surface opposing the channel, and a first aperture that spans from the first surface to the first channel and is of a particular diameter. The layered u-bracket also includes a second u-bracket having a second channel, a second surface opposing the second channel, and a second aperture that spans from the second surface to the second channel and is of the particular diameter. For the layered u-bracket, the second channel is flush with the first surface, and the first and second apertures are aligned.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process and/or structural changes may be made without departing from the scope of the present disclosure.

Figure 1A:
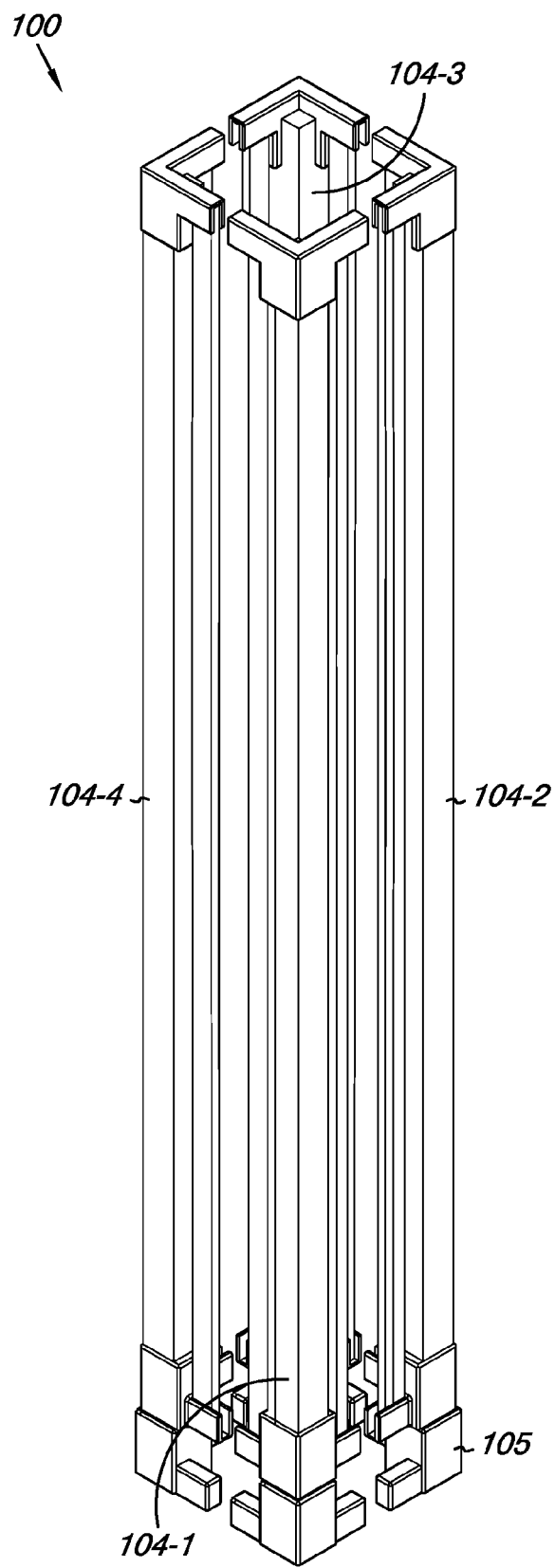
FIG. 1A illustrates a portable collapsible shelter in a collapsed position according to one or more embodiments of the present disclosure.

FIG. 1A illustrates a portable collapsible shelter 100 in a collapsed position according to one or more embodiments of the present disclosure. Although various embodiments of the present disclosure are described within the context of a portable collapsible shelter, embodiments are not so limited. For example, embodiments of the present disclosure can be used with carriages, tables, chairs, exercise equipment apparatuses, or other devices using collapsible truss assemblies.

The portable collapsible shelter 100 illustrated in FIG. 1A includes a number of legs, e.g., legs 104-1, 104-2, 104-3, and 104-4. A portable collapsible shelter can be configured with three legs to have a triangular base, four legs to have a rectangular base, or more legs for other bases. Embodiments are not limited to the number of legs given in the example embodiment of FIG. 1A. The legs, e.g., leg 104-1, can include telescoping lower portions 105 to allow a user to adjust the height of the shelter. Each leg can be connected to a number of, e.g., two, accordion-type collapsible truss assemblies, where another end of each truss assembly can be connected to another leg and/or to a roof support. A fully collapsed portable shelter can provide for ease of transport due, at least in part, to its compact size as compared to an expanded shelter. In some embodiments, a carrying mechanism, e.g., a bag, can be provided to further ease transport of the shelter.

Figure 1B:
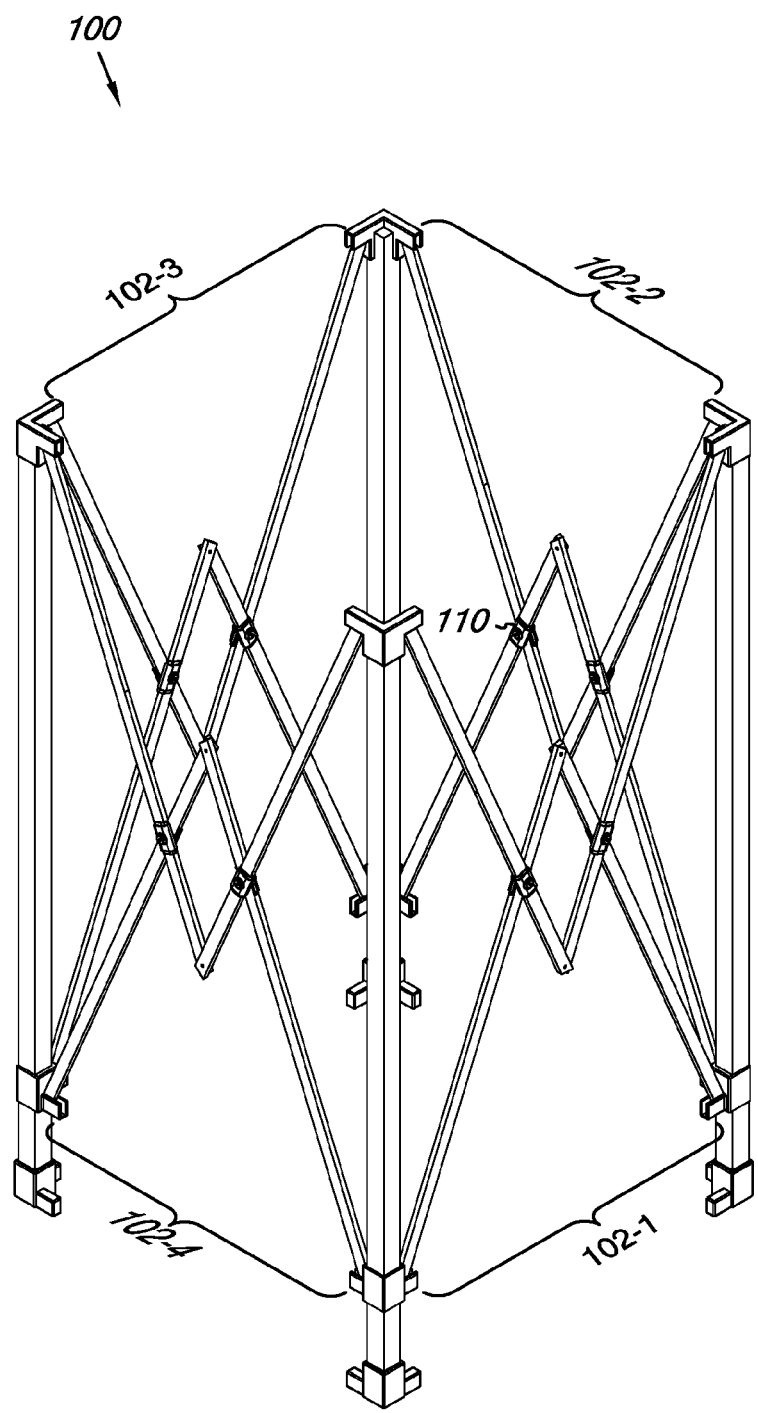
FIGS. 1B-1C illustrate the portable collapsible shelter of FIG. 1A in various partially expanded configurations.
Figure 1C:
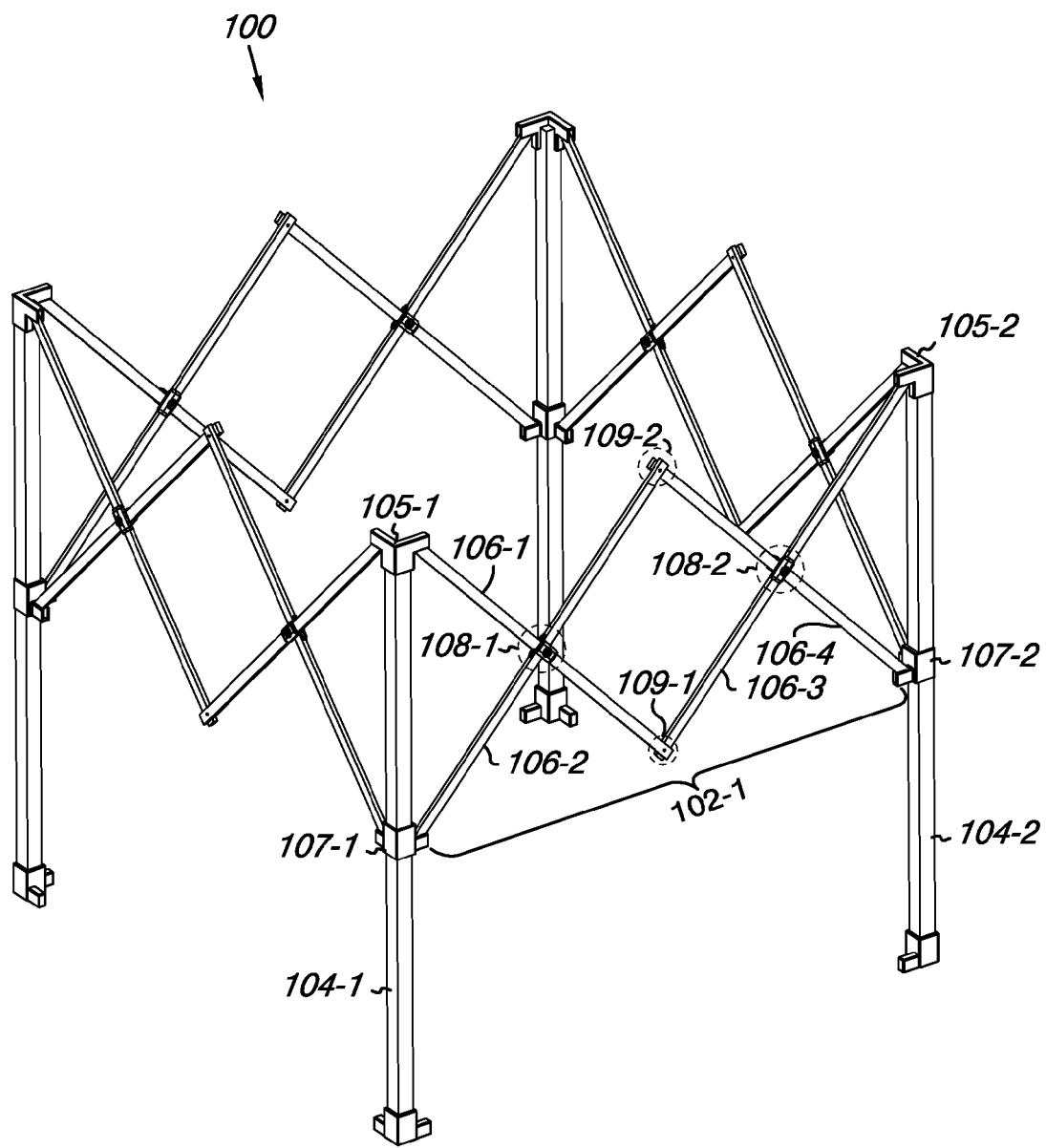

FIGS. 1B-1C illustrate the portable collapsible shelter 100 of FIG. 1A in various partially expanded configurations. Each accordion-type collapsible truss assembly 102-1, 102-2, 102-3, and 102-4 can include a number of truss assembly members, e.g., member 106, interconnected by at least two pivotal v-joints 109-1 and 109-2 and two pivotal x-joints 108-1 and 108-2.

For example, a collapsible truss assembly 102-1 extending between two legs 104-1 and 104-2 can include four truss members 106-1, 106-2, 106-3, 106-4. A first truss member 106-1 can be secured at one end to a fixed mounting bracket 105-1 near the top of a first leg 104-1. The first truss member 106-1 can be interconnected with a second truss member 106-2 at a pivotal x-joint 108-1 near a midpoint of the first and second truss members 106-1 and 106-2. The first truss member 106-1 can be interconnected with a third truss member 106-3 at a pivotal v-joint 109-1 at the other end of the first truss member 106-1.

The second truss member 106-2 can be secured on one end to a slidable mounting bracket 107-1 on the first leg 104-1. The second truss member 106-2 can also be secured to a fourth truss member 106-4 at a pivotal v-joint 109-2 at the other end. The third truss member 106-3 can be interconnected with the fourth truss member 106-4 at an x-joint 108-2 and secured to a second leg 104-2 at a fixed mounting bracket 105-2 near the top of the second leg 104-2. The fourth truss member 106-4 can be secured to the second leg 104-2 at a slidable mounting bracket 107-2. Embodiments are not so limited.

As illustrated in FIGS. 1A-1C, the pivotal v-joints, pivotal x-joints, and slidable mounting brackets can allow the collapsible shelter to contract to a relatively small configuration, and to expand to a larger area. During expansion, the slidable mounting brackets can move up, e.g., away from the ground, on the legs of the collapsible shelter. At the same time, the pivotal v-joints and x-joints can allow the truss members to pivot with respect to each other, expanding the shelter like an accordion. During contraction, the slidable mounting brackets can move down, e.g., toward the ground, on the legs of the collapsible shelter. At the same time, the pivotal v-joints and x-joints can allow the truss members to pivot with respect to each other, e.g., opposite of the pivot during expansion.

In one or more embodiments, the truss members can be hollow or have a honeycombed core, can be formed of a lightweight material, e.g., aluminum, and can have thin walls, e.g., 0.5-5.0 mm. The truss members can be interconnected at the pivotal x-joints and v-joints via a connecting member passing through one or more apertures in the truss members. For example, the truss members can be interconnected at pivotal x-joints via a bolt passing through an aperture at a longitudinal midpoint in each of the two truss members associated with the pivotal x-joint.

In one or more embodiments, the pivotal x-joints are reinforced with one or more of an external layered u-bracket, e.g., layered u-bracket 110, and/or an internal support body for the truss members. Such reinforcements are described in more detail below in connection with FIGS. 5-8. The support roof of the portable collapsible shelter can have various configurations, two of which are described below in connection with FIGS. 2A-2B.

Figure 2A:
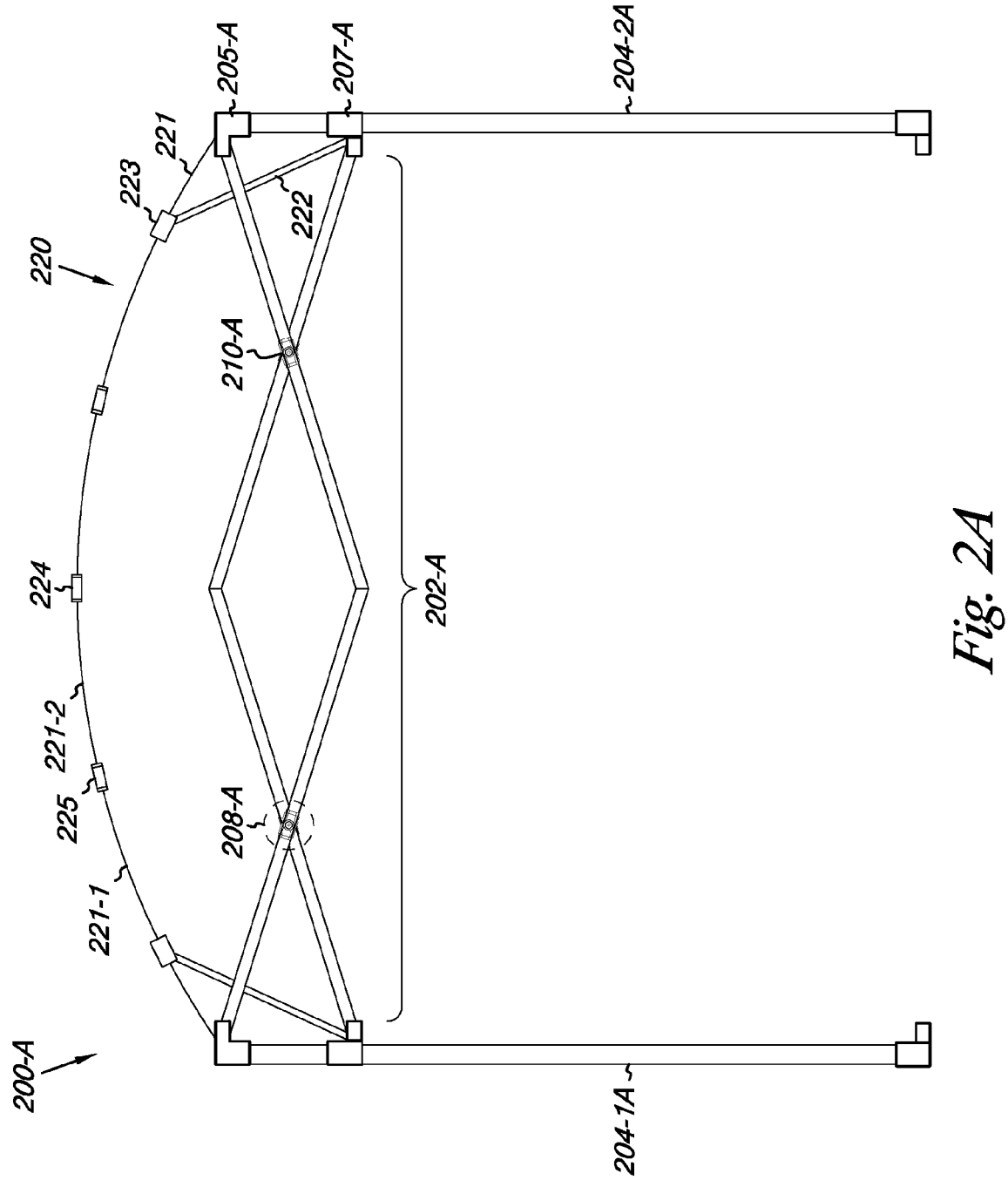
FIG. 2A illustrates a side view of a portable collapsible shelter having a cathedral support roof according to one or more embodiments of the present disclosure.

FIG. 2A illustrates a side view of a portable collapsible shelter having a cathedral support roof 220 according to one or more embodiments of the present disclosure. The roof, e.g., canopy, can be supported by a number of cathedral support members 221 extending from a number of legs, e.g., legs 204-1A and 204-2A. The legs can also support a number of collapsible truss assemblies, e.g., 202-A, that can include reinforced pivotal x-joints, e.g., x-joint 208-A, including a number of layered u-brackets, e.g., layered u-bracket 210-A, and/or internal support bodies.

In one or more embodiments, the cathedral support members 221 can have one end attached near the top of one of the number of legs, e.g., at a fixed mounting bracket 205-A. The cathedral support members 221 can be supported by a supplemental support member 222 having a first end connected to a slidable mounting bracket 207-A on a leg, e.g., leg 204-2A, of the collapsible truss assembly 202-A and a second end connected to a supplemental support connection portion 223 of the cathedral support member 221.

Each cathedral support member 221 can extend from the top of a leg to a center of the shelter, where the cathedral support members can collectively support the roof. For example, the roof, e.g., canopy, of the shelter can include a receiver 224 capable of receiving one or more of the cathedral support members 221. In some embodiments, the receiver 224 can be a molded plastic structure with a number of apertures for receiving the cathedral support members 221. One or inure embodiments can include a receiver 224 separate from the canopy, e.g., as fixed to one or more of the cathedral support members 221 or as a wholly separate receiver.

In one or more embodiments, the cathedral support members 221 can be formed from a flexible material, e.g., fiberglass. In some embodiments, each cathedral support member 221 can include two or more flexible material sections, e.g., sections 221-1 and 221-2 removably connected together, e.g., by a jacket 225 where one section includes a receiving portion and the other section includes an insertion portion. Embodiments are not so limited.

Figure 2B:
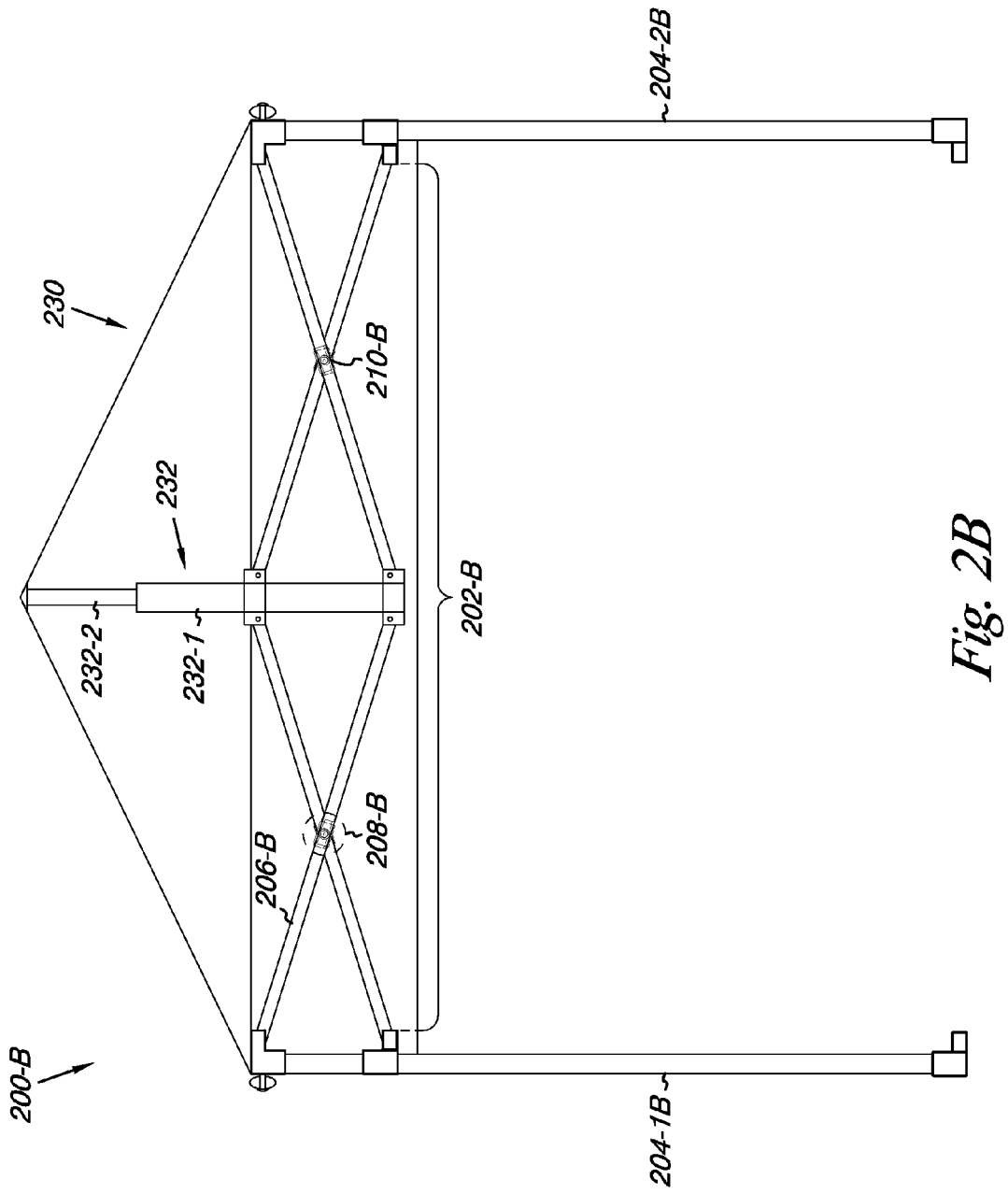
FIG. 2B illustrates a side view of a portable collapsible shelter having a center support roof according to one or more embodiments of the present disclosure.

FIG. 2B illustrates a side view of a portable collapsible shelter having a center support roof 230 according to one or more embodiments of the present disclosure. The roof, e.g., canopy, can be supported by an upwardly extending, e.g., away from the ground, central support member 232. The central support member 232 can include telescoping members, e.g., members 232-1 and 232-2, formed of a same or similar lightweight material as the remainder of the truss assembly members, e.g., member 206-B formed of thin walled aluminum. In one or more embodiments, the center support member 232 can be supported by two or more accordion-type collapsible truss assemblies, e.g., collapsible truss assembly 202-B, as described above, e.g., including a number of layered u-brackets, e.g., layered u-bracket 210-B, and/or internal support bodies, connected between two or more legs, e.g., legs 204-1B and 204-2B, and extending toward the center of the shelter. In some embodiments, the center support member 232 can be directly supported by four collapsible truss assemblies, one connected to each of four legs supporting the collapsible shelter. In one or more embodiments, the center support member can be supported by a number of, e.g., four, truss assemblies, each connected to at least one pivotal v-joint of a truss assembly, e.g., v-joints 109-1 and 109-2 in FIG. 1C, in lieu of being connected to one or more legs.

Figure 3A:
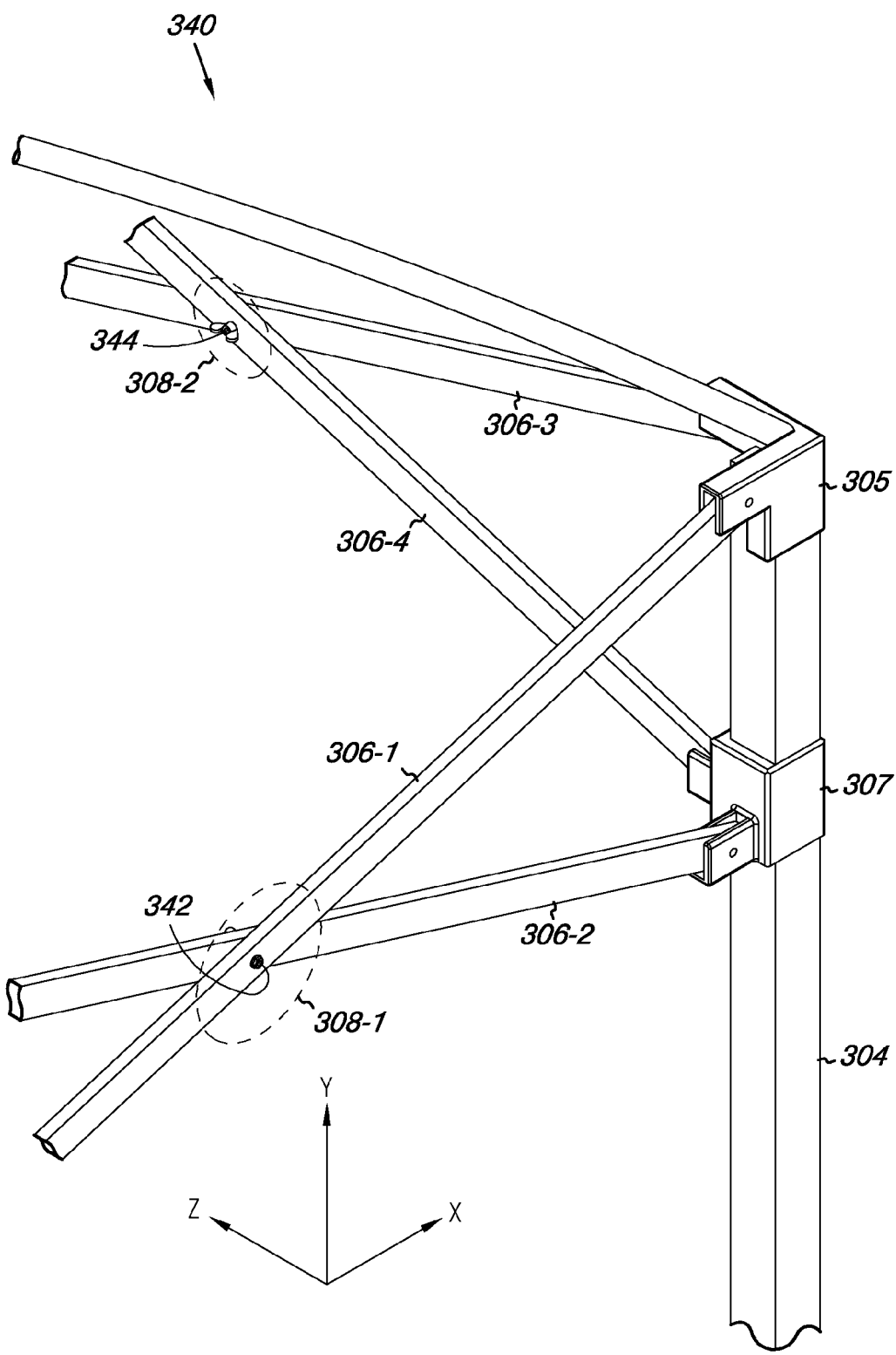
FIG. 3A illustrates a prior art portion of a collapsible truss assembly.

FIG. 3A illustrates a prior art portion 340 of a collapsible truss assembly. The portion 340 of the collapsible truss assembly includes two pairs of truss members 306-1 and 306-2, and 306-3 and 306-4, connected to a leg 304. A first member, e.g., member 306-1, of each pair is connected to a fixed mounting bracket 305 at the top of the leg 304. A second member, e.g., member 306-2, of each pair is connected to a slidable mounting bracket 307 lower on the leg 304. Each pair of truss members is interconnected at a midpoint of the truss members by a pivotal x-joint 308-1 and 308-2.

The pivotal x-joint, e.g., x-joint 308-1, includes a connecting member 342, e.g., a bolt, passing through the truss members 306-1 and 306-2 secured by a nut, e.g., wing-nut 344. According to various prior art approaches, the connecting member 342 can be secured directly to an exterior surface of the truss members, or to a cover fitted on one or more of the truss members. For example, U.S. Pat. No. 5,275,188 entitled "Modified Folding Tent" to Tsai includes a "U-shaped cover" over each truss member at the pivotal x-joint. Such a u-shaped cover can help protect a connecting member, e.g., a screw, against repeated interlocking and telescopic movements to help prolong the life of use. For example, interlocking movement of an unprotected joint can cause over-tightening of the connecting member potentially damaging one or more of a truss member and/or a connecting member. However, such a u-shaped cover, has been insufficient to protect truss members against axial deformation and failure due to loads placed on the truss assembly.

Such prior art collapsible truss assemblies have suffered deformation and failure at or near the pivotal x-joint. Factors contributing to such deformation and/or failure include user abuse by forcing the operation of setup and takedown, or weather related axial bending stresses, among other factors. For example, if two slidable members, e.g., slidable member 307, were locked in place while the user attempted to collapse or expand the truss assembly, significant force could be applied in the x-direction by one or more users in an attempt to force the truss assembly open and/or closed, e.g., by grasping two legs to compress and/or tense the truss assembly.

Figure 3B:
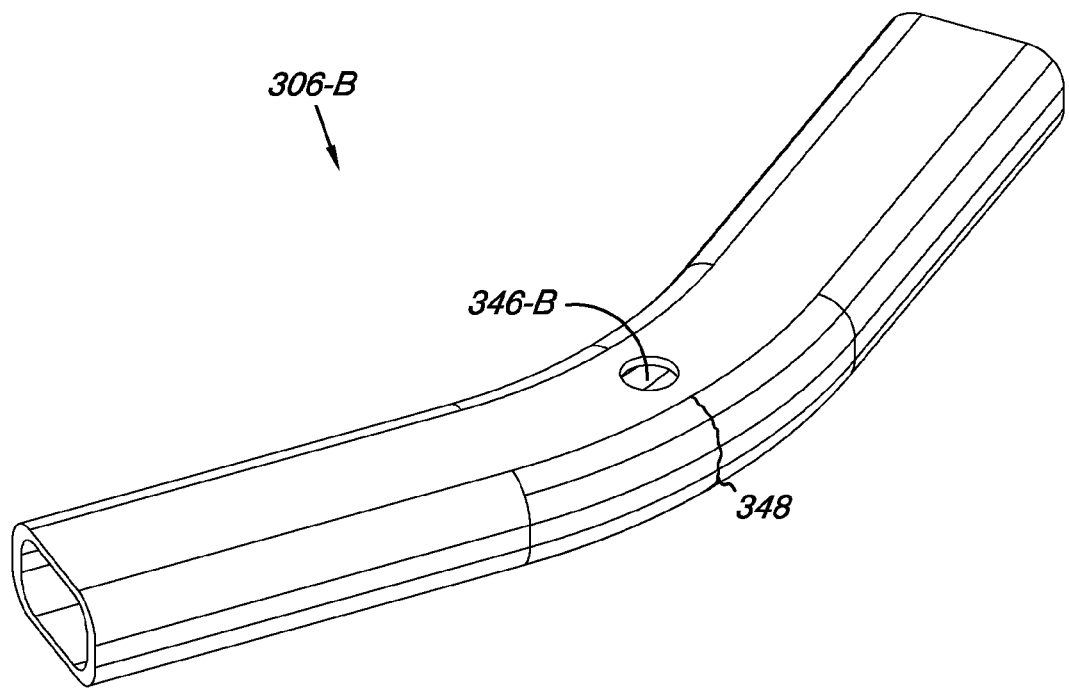
FIG. 3B illustrates a deformed prior art truss member.

FIG. 3B illustrates a deformed prior art truss member 306-B. The pivotal x-joint can be a weak point in the prior art collapsible truss assembly. For example, forces applied to the collapsible truss assembly, e.g., in the y-direction as illustrated in FIG. 3A, e.g., towards or away from the ground, can result in deformation, e.g., bending, about the connecting member at the pivotal x-joint, e.g., near an aperture 346-B in a truss member 306-B. Deformation of a truss member, e.g., truss member 306-B, can also lead to cracking 348, and possibly failure of the truss member. Forces that may cause such deformation may be associated with user operation or abuse, wind creating up and/or down drafts by interaction with the canopy, and/or other sources. For example, if one slidable member, e.g., slidable member 307, were locked in place while the user attempted to collapse or expand the truss assembly, significant force could be applied in the y-direction at the pivotal x-joint 308-1 as the user attempts to force the truss assembly open and/or closed, e.g., when one slidable member is allowed to move, but the other remains locked, transferring force up to the pivotal x-joint. Other applied forces and/or conditions can cause deformation and/or failure near a pivotal x-joint.

Figure 3C:
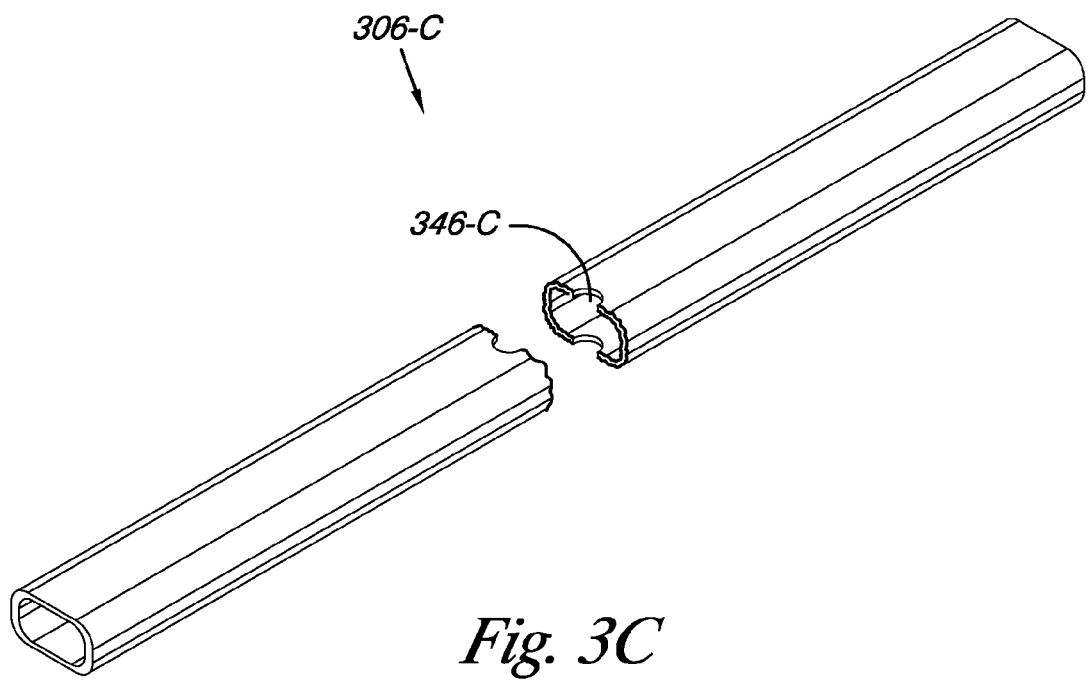
FIG. 3C illustrates a failed prior art truss member.

FIG. 3C illustrates a failed prior art truss member 306-C. In some instances, forces applied to the collapsible truss assembly, e.g., in the z-direction, as illustrated in FIG. 3A, can result in failure, e.g., shearing, at or near a pivotal x-joint, e.g., near an aperture 346-C, associated with a connecting member in one or more truss members. Forces received at x-joints in the z-direction along a longitudinal length of the connecting member, e.g., bolt, may result in significant shear stress on the connecting member and truss members at the pivotal x-joint. Such forces may be associated with wind, pocketing of moisture, user operation, and other sources. Other potentially damaging forces associated with operation of a portable collapsible shelter will be appreciated by one of ordinary skill in the art. Other applied forces and/or conditions can cause deformation and/or failure near a pivotal x-joint.

Figure 3D:
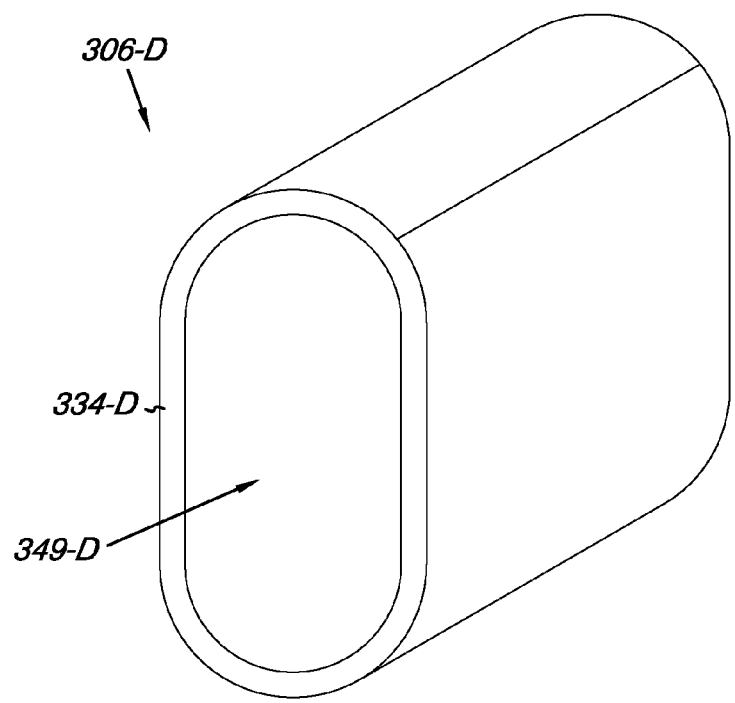
FIG. 3D illustrates a hollow prior art truss member.

FIG. 3D illustrates a hollow prior art truss member 306-D. A truss member may include a rigid outer wall 334-D formed from a particular material. The wall 334-D may surround a hollow interior portion 349-D. For example, some prior art truss assemblies included truss members formed from steel. Truss assemblies for industrial applications may include truss members having thick walled steel sections, creating durable, but heavy truss assemblies. Such steel assemblies may be formed such that failure of a connecting member, e.g., a screw, may be more common than failure of a steel truss member. Some truss assemblies created for personal use, e.g., portable collapsible shelters, may include truss members formed of aluminum, sometimes having thinner walls than truss assemblies formed of steel. Thinner walled aluminum may be used for fabricating such assemblies due, in part, to the higher cost of aluminum, as compared to steel.

Figure 3E:
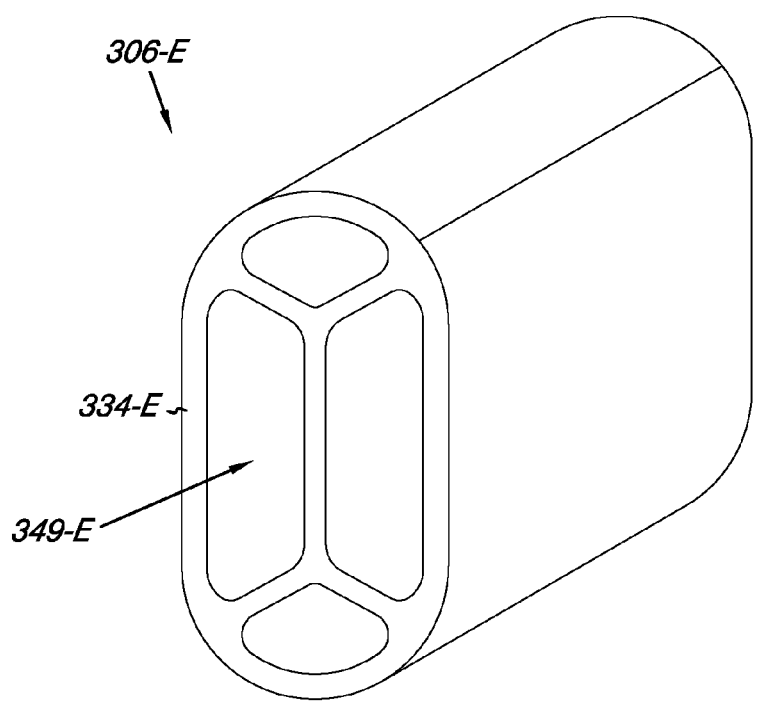
FIG. 3E illustrates a honeycombed prior art truss member.

FIG. 3E illustrates a honeycombed prior art truss member 306-E. A truss member may include a rigid outer wall 334-E that may be formed of a same or different material than an interior honeycombed portion 349-E, e.g., core. U.S. patent application Ser. No. 11/301,981 entitled "Structural Support Member" to Mallookis et al. provides an example of such a honeycombed truss member.

Figure 4A:
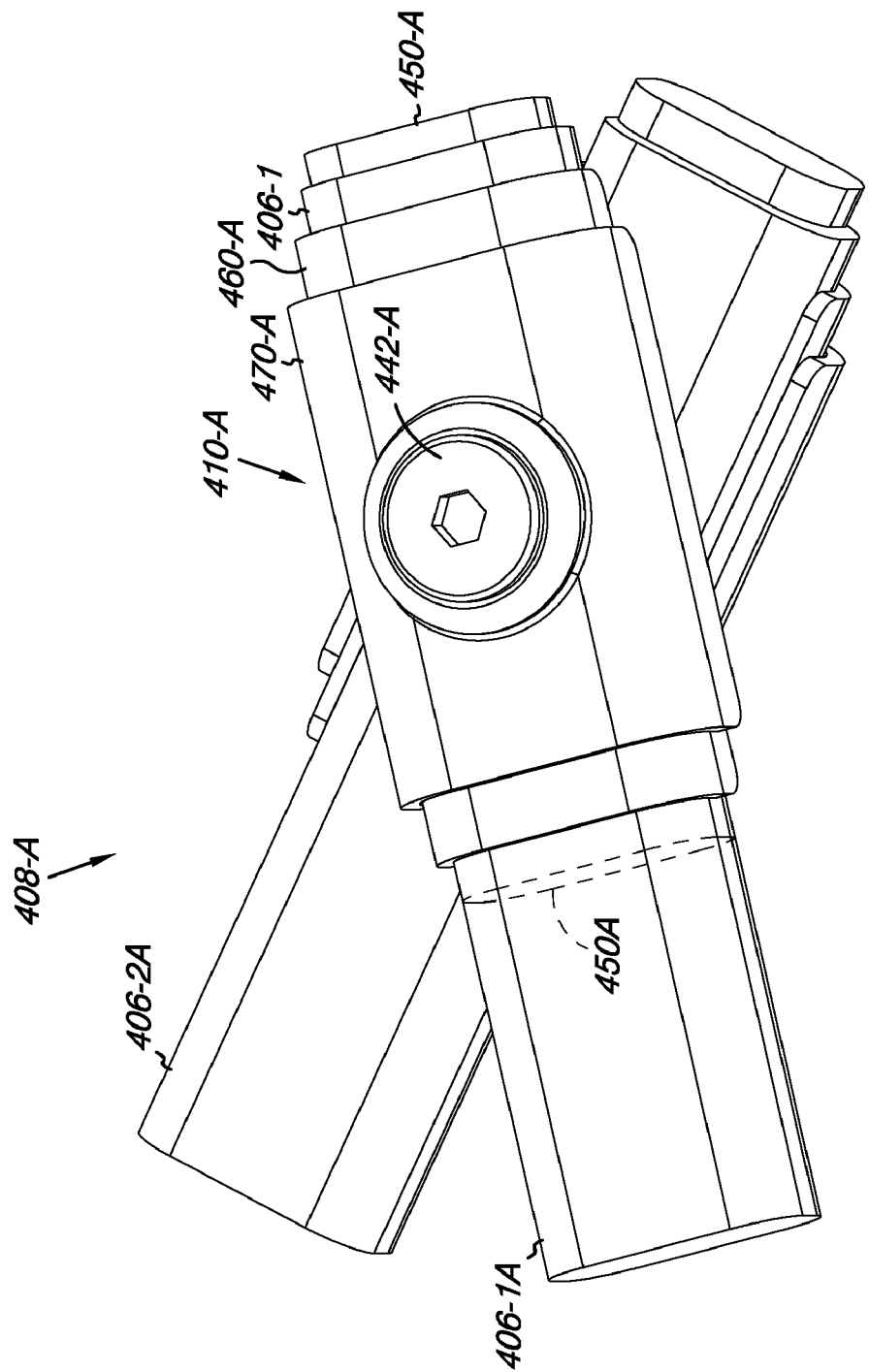
FIG. 4A illustrates a cut-away view of a pivotal x-joint according to one or more embodiments of the present disclosure.

FIG. 4A illustrates a cut-away view of a pivotal x-joint 408-A according to one or more embodiments of the present disclosure. The pivotal x-joint 408-A can include a number of e.g., two, truss members 406-1A and 406-2A of a collapsible truss assembly, each having a number of e.g., two, aligned apertures through opposing longitudinal-latitudinal walls. One or more of the truss members, e.g., member 406-1A, can include an internal support body 450-A, e.g., an elongate body as described below in more detail in connection with FIG. 8A, having an aperture that is aligned with the apertures through each truss member. Each truss member, e.g., member 406-1A, can have a supporting layered u-bracket 410-A, including a first u-bracket 460-A and a second u-bracket 470-A. A layered u-bracket is described in more detail in connection with FIGS. 5-7B. The first u-bracket 460-A can be flush with a truss member 406-1A. The second u-bracket 470-A can be flush with the first u-bracket 460-A. The layered u-bracket 410-A can have an aperture aligned with that of the truss member 406-A and internal support body 450-A such that a connecting member 442-A, e.g., a bolt, can pass through the entire pivotal x-joint assembly 410-A.

Figure 4B:
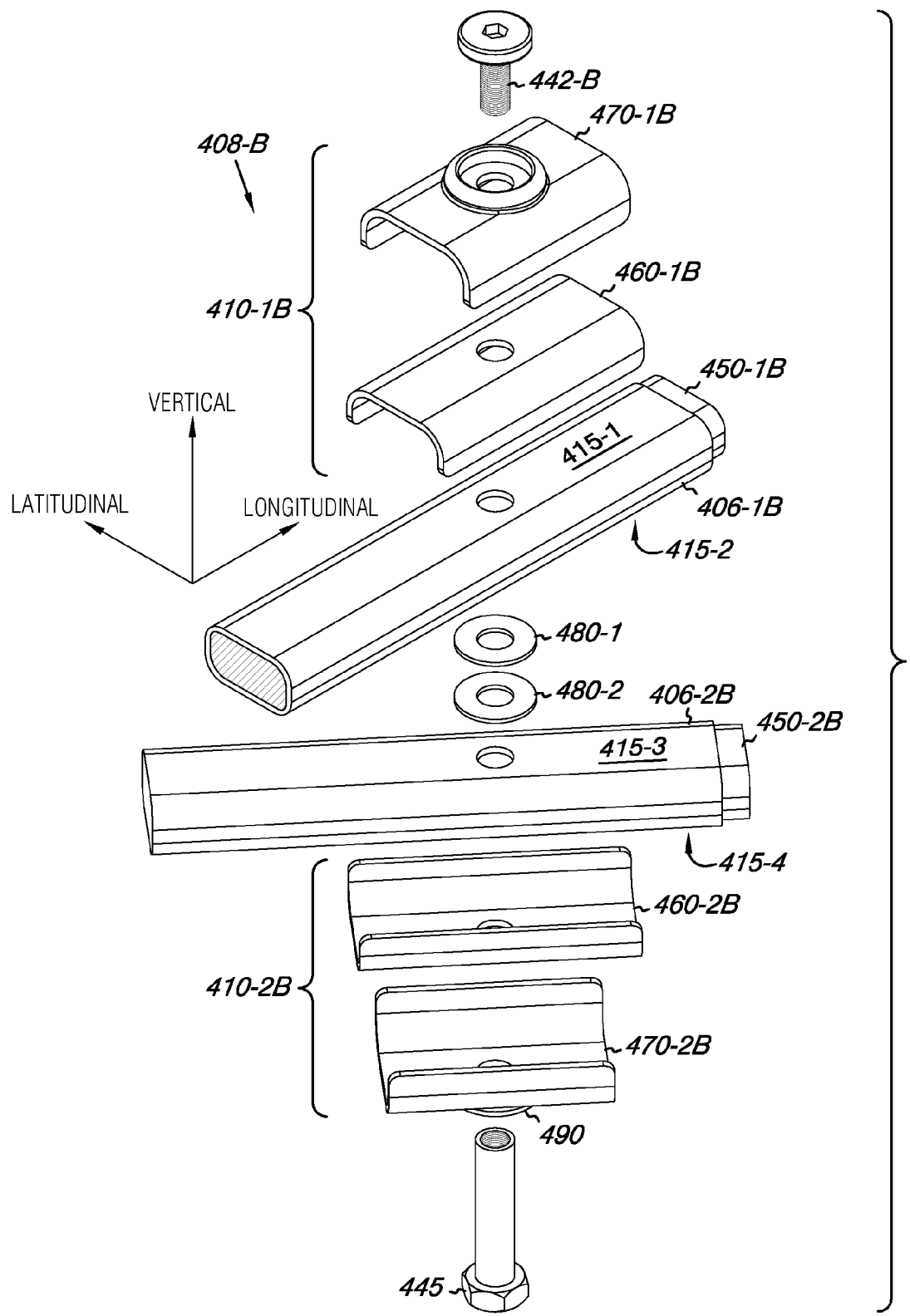
FIG. 4B illustrates an exploded view of a pivotal x-joint according to one or more embodiments of the present disclosure.

FIG. 4B illustrates an exploded view of a pivotal x-joint 408-B according to one or more embodiments of the present disclosure. As described above, the pivotal x-joint can be at a longitudinal midpoint of each truss member associated with the x-joint, e.g., two truss members in a collapsible truss assembly having accordion-type truss connections in a portable shelter. The x-joint can allow pivoting of each truss member through rotation about a connecting member placed through the aligned apertures in the various components associated with the pivotal x-joint. For example, a connecting member, e.g., including a screw 442-B and a non-compression sleeve 445, can pass through, in order: a first layered u-bracket 410-1B from second u-bracket 470-1B to first u-bracket 460-1B; a first wall 415-1 of a first truss member 406-1B; a first internal support body 450-1B; a second wall 415-2 of the first truss member 406-1B; one or more washers, e.g., washers 480-1 and 480-2; a first wall 415-3 of a second truss member 406-2B; a second internal support body 450-2B; a second wall 415-4 of the second truss member 406-2B; and a second layered u-bracket 410-2B from first u-bracket 460-2B to second u-bracket 470-2B.

One or more embodiments of the present disclosure can include layered u-brackets on both longitudinal sides of a truss member, e.g., on first wall 415-1 and second wall 415-2 of first truss member 406-1B. Such a layered u-bracket may be provided with or without an annulus portion. For example, one truss member could include a layered u-bracket flush with a first longitudinal wall and having an annulus portion, and a second layered u-bracket flush with a second longitudinal wall and not having an annulus portion. Such embodiments can be useful in providing additional strength at a corresponding pivotal joint.

A portion of the connecting member can be secured by a nut or a polygonal head, e.g., of a non-compression sleeve 445, which can be housed within an annulus portion 490 of a layered u-bracket, e.g., layered u-bracket 410-2B. In some embodiments, the connecting member can be formed from steel, or another material. Other forms of connecting members can be used with embodiments of the present disclosure, as will be understood by one of ordinary skill in the art. The one or more washers, e.g., washers 480-1 and 480-2, placed between the truss members 406-1B and 406-2B at the pivotal x-joint 408-B can be formed of a lightweight material that allows the members to pivot with relatively little friction, e.g., nylon.

Figure 5:
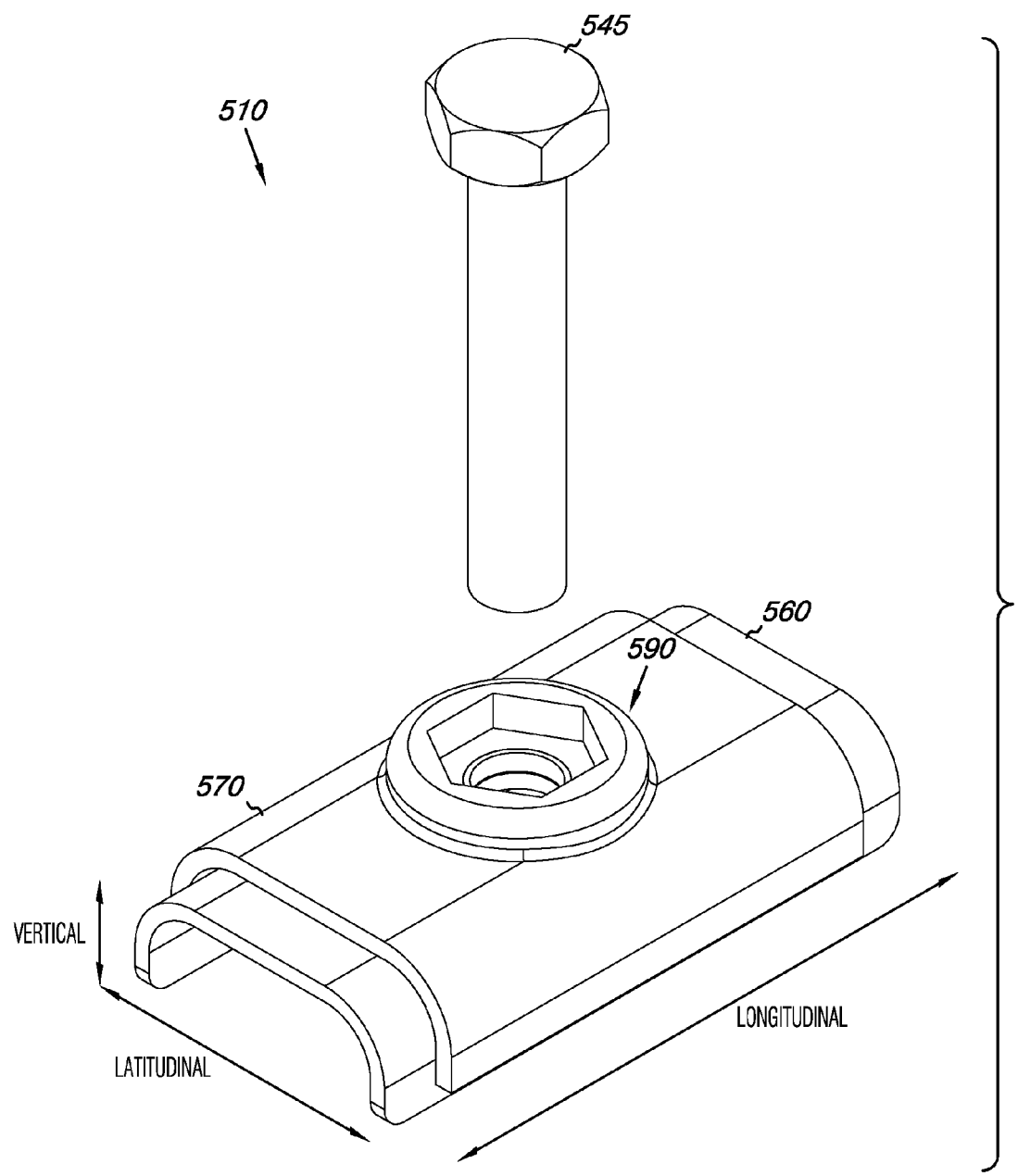
FIG. 5 illustrates a layered u-bracket according to one or more embodiments of the present disclosure.

FIG. 5 illustrates a layered u-bracket 510 according to one or more embodiments of the present disclosure. The layered u-bracket 510 includes a first u-bracket 560 and a second u-bracket 570 that can be connected to a collapsible truss assembly member by a connecting member, e.g., as shown in FIGS. 4A-4B. The first u-bracket 560 can be flush with the truss member and the second u-bracket 570 can be flush with the first u-bracket 560. The second u-bracket 570 can have an annulus portion 590 that can be configured to house a connecting member, e.g., a nut and/or a non-compression sleeve 545 having a polygonal head, for securing the connecting member. For example, the annulus portion 590 of the second u-bracket 570 illustrated in FIG. 5 has a hexagonal geometry for securing a non-compression sleeve 545 having a hexagonal head. The connecting member can pass through aligned apertures in the layered u-bracket 510 and truss member. As used herein, reference axes include longitudinal, latitudinal, and vertical, as illustrated in FIG. 5. The first u-bracket is described in more detail below in connection with FIGS. 6A-6B, while the second u-bracket is described in more detail below in connection with FIG. 7A-7B.

Figure 6A:
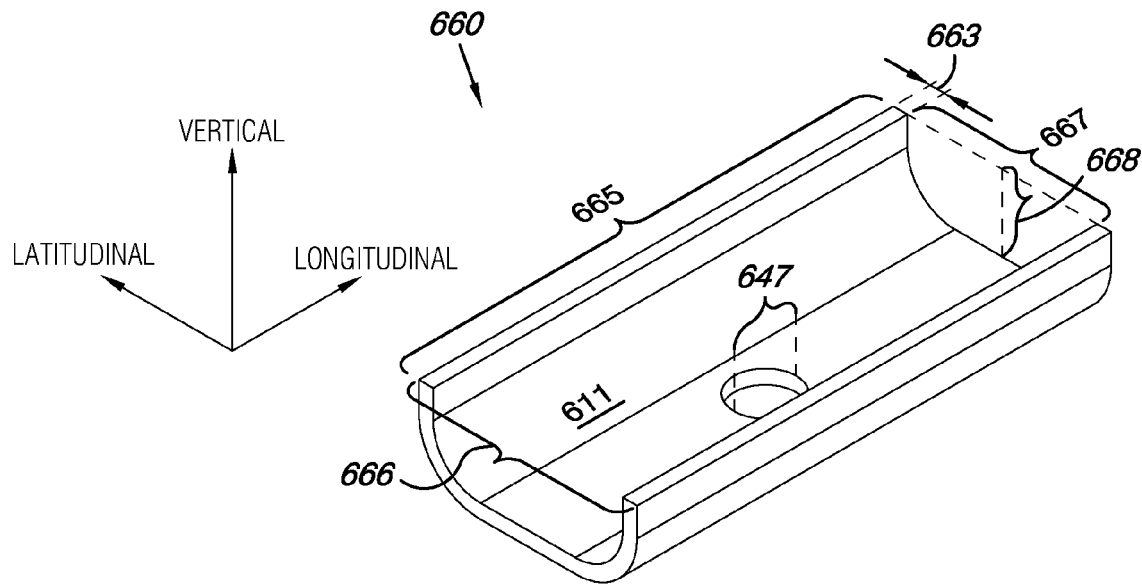
FIGS. 6A-6B illustrate a first u-bracket of a layered u-bracket according to one or more embodiments of the present disclosure.
Figure 6B:
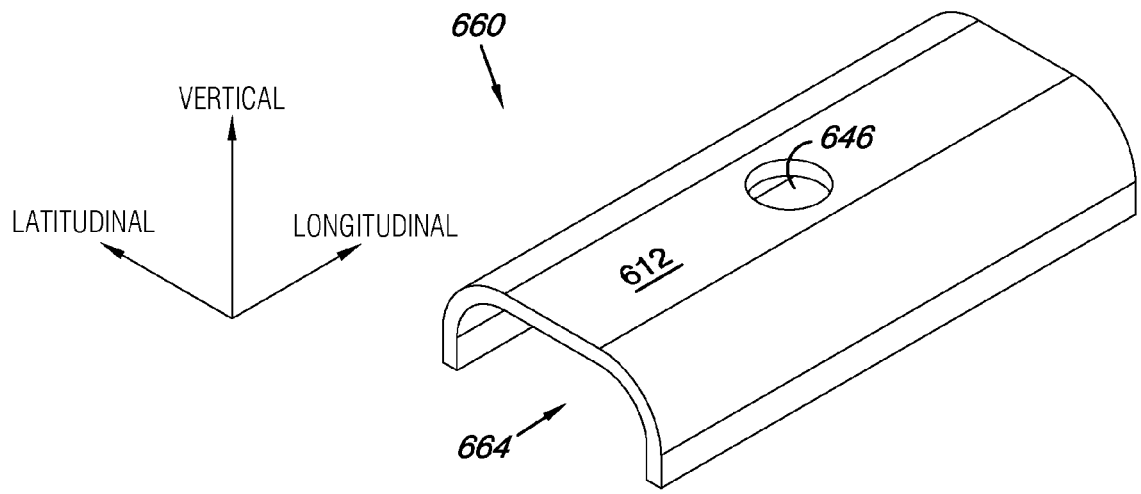

FIGS. 6A-6B illustrate a first u-bracket 660 of a layered u-bracket according to one or more embodiments of the present disclosure. The first u-bracket 660 can have a channel 664 defined by an interior surface 611 opposed to an exterior surface 612, e.g., a surface opposing the channel. The first u-bracket 660 can be formed of a same material as the truss member to which it is attached, e.g., a lightweight material such as aluminum. Such embodiments can allow the first u-bracket 660 to respond in kind with the truss member to which it is attached to various mechanical and thermal stresses, e.g., from expansion and/or contraction due to heating and/or cooling. In some embodiments, the first u-bracket 660 can be formed from a material different than that of the truss member to which it is attached, e.g., the truss member could be aluminum and the first u-bracket can be steel. Such embodiments can allow the first u-bracket 660 to provide additional strengthening, e.g., resistance to deformation, where the first u-bracket 660 is placed. Embodiments are not limited to these examples of materials. The first u-bracket 660 can be affixed to a truss member such that it is flush with the truss member. That is, the latitudinal channel width 667 of the first u-bracket 660 channel 664 can be just larger than a latitudinal width of a portion of a truss member such that the first u-bracket is seated flush with the truss member.

The first u-bracket 660 can have a particular thickness 663, e.g., 0.5-3 millimeters (mm). In some embodiments, the thickness 663 of the first u-bracket 660 can be 1.5 mm. The first u-bracket 660 can have a particular longitudinal length 665, e.g., 25-100 mm, and a particular width 666, e.g., 10-50 mm. In one or more embodiments, the u-bracket 660 has a longitudinal length 665 of 50 mm and a width 666 of 23 mm. The first u-bracket 660 can have a particular channel depth 668, e.g., 4-20 mm, and a particular channel width 667, e.g., 10-40 mm. In one or more embodiments, the channel depth 668 can be 8 mm and the channel width 667 can be 20 mm.

The first u-bracket 660 can have an aperture 646 that spans from the channel 664 to the surface opposing the channel 612. The aperture 646 can be centrally located in a longitudinal-latitudinal plane of the channel surface 611 and the surface opposing the channel 612. The aperture 664 can be circular with a particular diameter 647, e.g., 3-15 mm. In one or more embodiments the diameter 647 can be 6.5 mm. When the first u-bracket 660 is fixedly attached to the collapsible truss assembly at a pivotal x-joint, a connecting member, e.g., a threaded sleeve and screw, can pass through the aperture 646 to secure the first u-bracket 660, e.g., as part of a layered u-bracket, to one of a number of truss members.

The first u-bracket 660 can help to protect the truss member from deforming and/or shearing due to loads placed on the collapsible truss assembly that can centralize at a pivotal x-joint. The first u-bracket 660 may be particularly useful for truss assemblies that utilize lightweight materials such as thin walled aluminum due to an increased susceptibility to deformation and/or shearing as compared to, for example, heavier truss assemblies formed from steel.

Figure 7A:
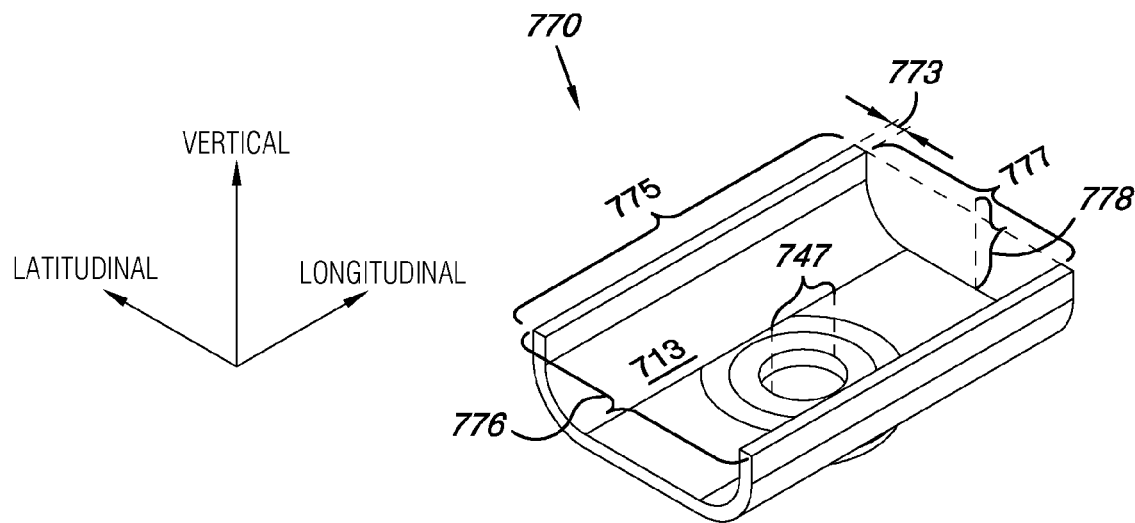
FIGS. 7A-7B illustrate a second u-bracket of a layered u-bracket according to one or more embodiments of the present disclosure.
Figure 7B:
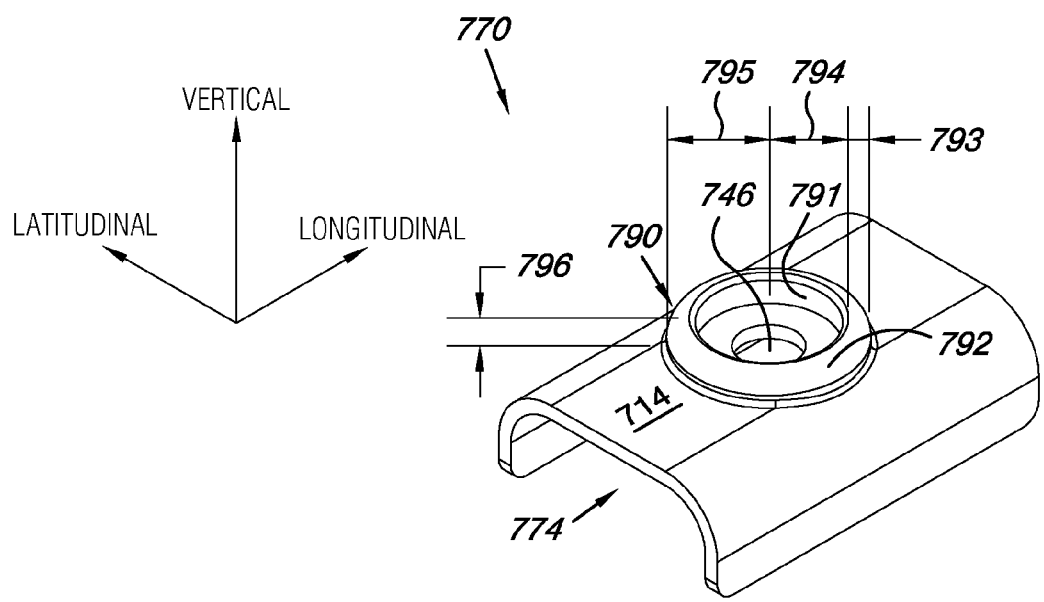

FIGS. 7A-7B illustrate a second u-bracket 770 of a layered u-bracket according to one or more embodiments of the present disclosure. The second u-bracket 770 can have a channel 774 defined by an interior surface 713 opposed to an exterior surface 714, e.g., a surface opposing the channel. The second u-bracket 770 can be formed of a lightweight material, e.g., nylon. In one or more embodiments, the second u-bracket 770 can be formed of a same material as the internal support body for truss members described below in connection with FIG. 8A. Various methods can be used to form the second u-bracket, e.g., extrusion, casting, and/or injection molding.

The second u-bracket 770 can have a particular thickness 773, e.g., 1-3 mm. In some embodiments the thickness 773 of the second u-bracket 770 can be 1.5 mm. The second u-bracket 770 can have a particular longitudinal length 775, e.g., 20-80 mm, and a particular latitudinal width 776, e.g., 12-60 mm. In some embodiments, the second u-bracket 770 can have a longitudinal length 775 of 40 mm and a latitudinal width 776 of 27.2 mm. In one or more embodiments, the second u-bracket 770 can have a longitudinal length 775 less than that of a first u-bracket, e.g. first u-bracket 660 in FIGS. 6A-6B, to which it is attached. The second u-bracket 770 can have a particular channel depth 778, e.g., 5-25 mm and a particular channel width 777, e.g., 10-50 min. In one or more embodiments, the channel depth 778 can be 9.6 mm and the channel width 777 can be 23.2 mm.

The second u-bracket 770 can have an aperture 746 that spans from the channel 774 to the surface opposing the channel 714. The aperture 746 can be centrally located in a longitudinal-latitudinal plane of the channel surface 713 and the surface opposing the channel 714. The aperture 746 can be circular with a particular diameter 747, e.g., 3-15 mm. In some embodiments the diameter 747 can be 6.5 mm. The diameter 747 of the aperture 746 in the second u-bracket 770 can be the same as the diameter 647 of the aperture 646 in the first u-bracket 660, as illustrated in FIGS. 6A-6B. When attached as a layered u-bracket, the respective apertures, e.g., apertures 646 and 746, can be aligned to allow passage of a connecting member therethrough. The second u-bracket 770 can be affixed to a first u-bracket, e.g., first u-bracket 660 in FIGS. 6A-6B, such that it is flush with the first u-bracket, e.g., such that the channel 774 of the second u-bracket 770 is flush with a surface opposing the channel 612 of the first u-bracket 660, as illustrated in FIGS. 6A-6B. That is, the latitudinal width 777 of the second u-bracket channel 774 can be just larger than that of the first u-bracket to which the second u-bracket 770 is to be attached such that the second u-bracket 770 is seated flush with the first u-bracket.

The second u-bracket 770 can include an annulus portion 790 that extends perpendicular to the second surface 714 and that is defined by an inner wall 791 located a first radial distance from the aperture 746 and an outer wall 792 located a second radial distance from the aperture 746. In some embodiments, the inner 791 and outer 792 walls of the annulus portion 790 can have a circular geometry. In one or more embodiments, the inner wall 791 of the annulus portion 790 can have a polygonal geometry while the outer wall 792 of the annulus portion 790 can have a circular geometry.

The annulus portion 790 can have a particular thickness 793, e.g., 2-10 mm. Accordingly, the annulus portion 790 can have a particular inner radius 794, e.g., 5-25 mm, and a particular outer radius 795, e.g., 7-35 mm. In one or more embodiments the inner radius 794 can be 13 mm and the outer radius 795 can be 18 mm, which can give the annulus portion 790 a thickness 793 of 5 mm. The annulus portion 790 can have a particular height 796 above a surface opposing the channel 714 of the second u-bracket 770, e.g., 1-10 mm. In some embodiments, the height 796 of the annulus portion 790 can be 3 mm. In embodiments where the annulus potion 790 has an inner wall 791 with a polygonal geometry, the dimensions can be configured to receive a polygonal connecting member without allowing the polygonal connecting member to rotate within the annulus portion 790.

For embodiments where the inner wall 791 of the annulus portion 790 has a polygonal geometry, the geometry can be configured to secure a connecting member, where a portion of the connecting member has the same polygonal geometry. For example the connecting member can be a nut and bolt, where the bolt is a socket screw having a pan head with a circular geometry and an at least partially threaded shaft. In such embodiments, the nut can have a polygonal, e.g., hexagonal, geometry that conforms to the geometry of the annulus portion of the second u-bracket, e.g., as shown in FIG. 5. In such embodiments, the second u-bracket can 770 secure the nut such that it does not rotate to loosen or tighten on the socket screw. In one or more embodiments, the bolt head can have a polygonal head that can be secured within the inner wall of the annulus portion 790 having a polygonal geometry.

In one or more embodiments, the connecting member can include a non-compression shaft with a smooth exterior and a hollow threaded interior. The non-compression shaft can include a polygonal head that can be secured within an annulus portion having a polygonal geometry as described above. The connecting member can include a screw threaded to fit within the threaded interior of the non-compression shaft. The screw can have any of a variety of heads including those with a circular or polygonal geometry. The screw may be socket driven, for example.

Such embodiments can be beneficial in helping to prevent over tightening of the connecting member that can lead to reduced adjustability, e.g., increased friction at one or more pivotal joints that makes it difficult for a user to expand and/or collapse the shelter. Such embodiments can be beneficial in helping to prevent damage to the layered u-bracket and/or truss member from over tightening the connecting member, e.g., crushing the layered u-bracket and/or truss member. Such embodiments can be useful in helping to prevent the collapsible truss assembly from becoming loose, which could lead to instability or failure of the collapsible truss assembly, or complete detachment in certain areas with repeated expansion and contraction of the collapsible shelter. That is, according to one or more embodiments described herein, the various truss members can be allowed to rotate at the pivotal x-joints (and pivotal v-joints) over portions of connecting members, but such rotation may have a reduced ability to allow the connecting member to tighten or loosen. Furthermore, the annulus portion 790 can help to prevent the connecting member from damage, e.g., from being struck by objects moving along a longitudinal portion of the layered u-bracket and/or truss member, among other benefits.

Figure 8A:
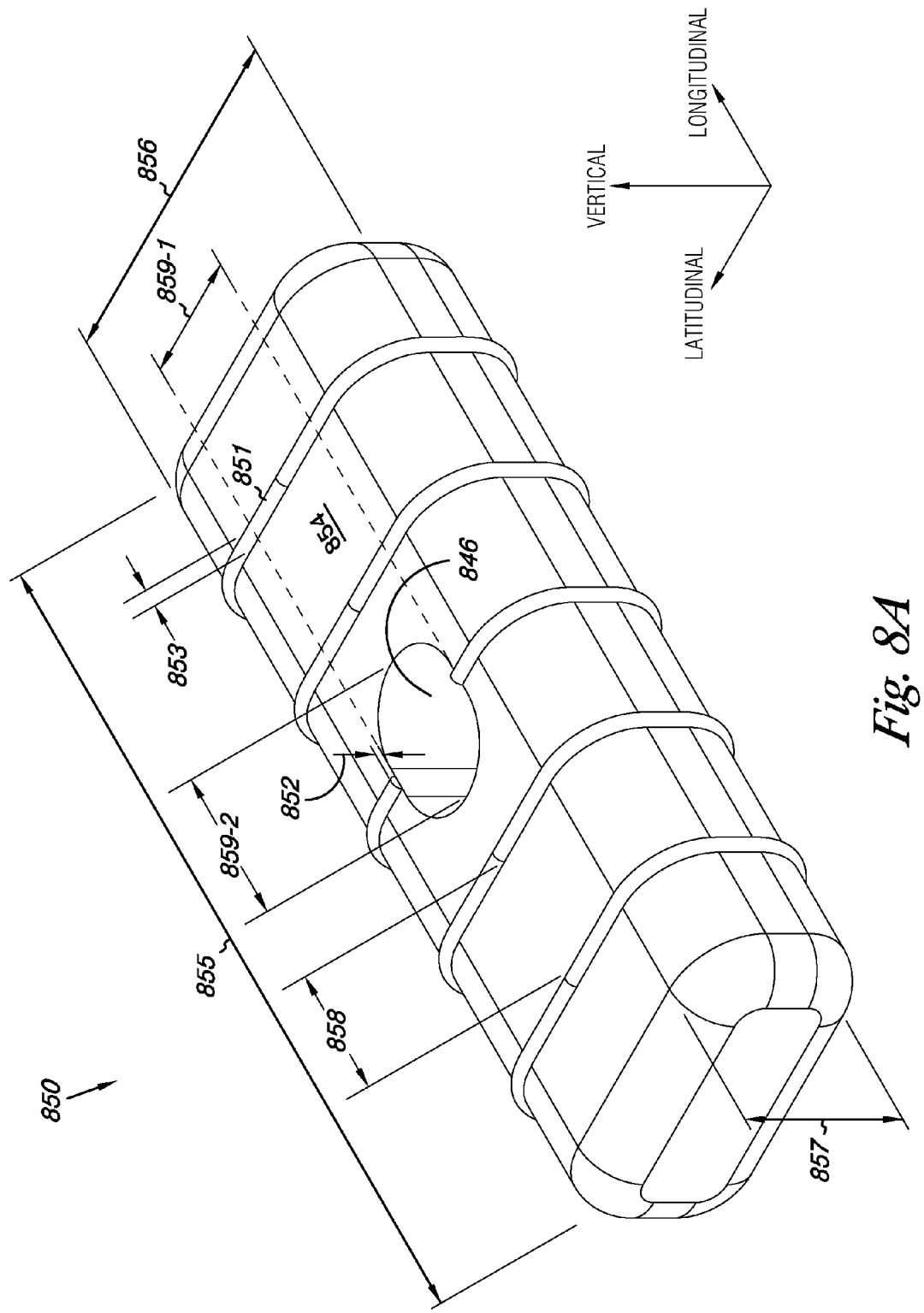
FIG. 8A illustrates an internal support body for a truss member according to one or more embodiments of the present disclosure.

FIG. 8A illustrates an internal support body 850 for a truss member according to one or more embodiments of the present disclosure. The internal support body 850 can be an elongate body configured substantially as a rectangular prism with rounded edges. The internal support body 850 can have a number of ribs, e.g., rib 851, surrounding a latitudinal-vertical plane of the exterior of the internal support body 850. When the internal support body 850 is situated within a truss assembly member, the ribs, e.g. rib 851, can be flush with the inner surfaces of the truss member. Such a configuration can assist in correct and stable positioning of the internal support body 850 and easier assembly during manufacturing, e.g., by providing support for the truss member in which the internal support body 850 is positioned, but not providing too much friction to allow the internal support body 850 to slide within the truss member. The internal support body 850 can be formed from a lightweight material, e.g., nylon. In one or more embodiments, the internal support body 850 can be formed of the same material as the second u-bracket. In some embodiments, the internal support body 850 can have a solid body, i.e., the internal support body is not hollow.

The internal support body 850 can have a particular longitudinal length 855, e.g., 30-120 mm, a particular latitudinal width 856, e.g., 10-40 mm, and a particular vertical height 857, e.g., 4-16 mm. In one or more embodiments, the longitudinal length 855 can be 60 mm, the latitudinal width 856 can be 17.8 mm, and the vertical height 857 can be 7.8 mm. In some embodiments, the internal support body 850 can have a longitudinal length 855 less than that of the truss member in which it is located. For example, an internal support body 850 can be located within a truss member at a pivotal x-joint, but not extending greatly beyond the joint. Such embodiments can provide significant strengthening of a pivotal x-joint, for example, without dramatically increasing the overall weight of the portable collapsible shelter. The internal support body 850 can have other geometric configurations than the particular embodiments described herein.

The ribs 851, can have a rounded edge with a particular height 852, e.g., 0.1-0.5 mm, above a surface 854 of the internal support body 850. In some embodiments, the radius height 852 of the ribs can be 0.2 mm. The ribs 851 can have a particular width 853, e.g., 0.5-4 mm. In one or more embodiments the ribs 851 can have a width 853 of 1 mm. The ribs 851 can be spaced any distance 858 apart. In one or more embodiments the ribs 851 can be spaced 10 mm apart along the longitudinal axis of the internal support body 850. The internal support body 850 can be sized such that the ribs 851 are seated flush with the inner surfaces of the truss member that it supports. In some embodiments, the internal support body 850 can be configured without ribs 851 such that one or more exterior surfaces of the internal support body 850 are flush with one or more internal surfaces of the truss member in which the internal support body 850 is situated.

The internal support body 850 can include an aperture 846 extending vertically through the elongate body of the internal support body 850. The aperture 846 through the internal support body 850 can be aligned with one or more apertures through latitudinal-vertical planar surfaces of the truss assembly member in which the internal support body 850 is situated. As such, a connecting member, e.g., a non-compression sleeve, can pass through the aperture 846 in the internal support body 850 as well as the apertures in the truss member. Additionally, the same connecting member can pass through a layered u-bracket when so configured, e.g., as illustrated in FIGS. 4A-4B. The aperture 846 through internal support body 850 can have a racetrack oval shape with a particular shorter diameter 859-1, e.g., 3-15 mm and a particular longer diameter 859-2, e.g., 3-17 mm. In some embodiments the shorter diameter 859-1 can be 6.5 mm and the longer diameter 859-2 can be 8.5 mm.

Embodiments including an internal support body 850 in one or more members of a collapsible truss assembly, particularly at pivotal x-joints, can provide a number of advantages over prior art collapsible truss assemblies. For example, the internal support body 850 can provide additional strength to the truss members at the joint to withstand core axial deformation, breaking stresses, tensile loading, and torsion, among others. One of ordinary skill in the art, having read and understood the present disclosure will appreciate additional advantages of the embodiments described herein.

Figure 8B:
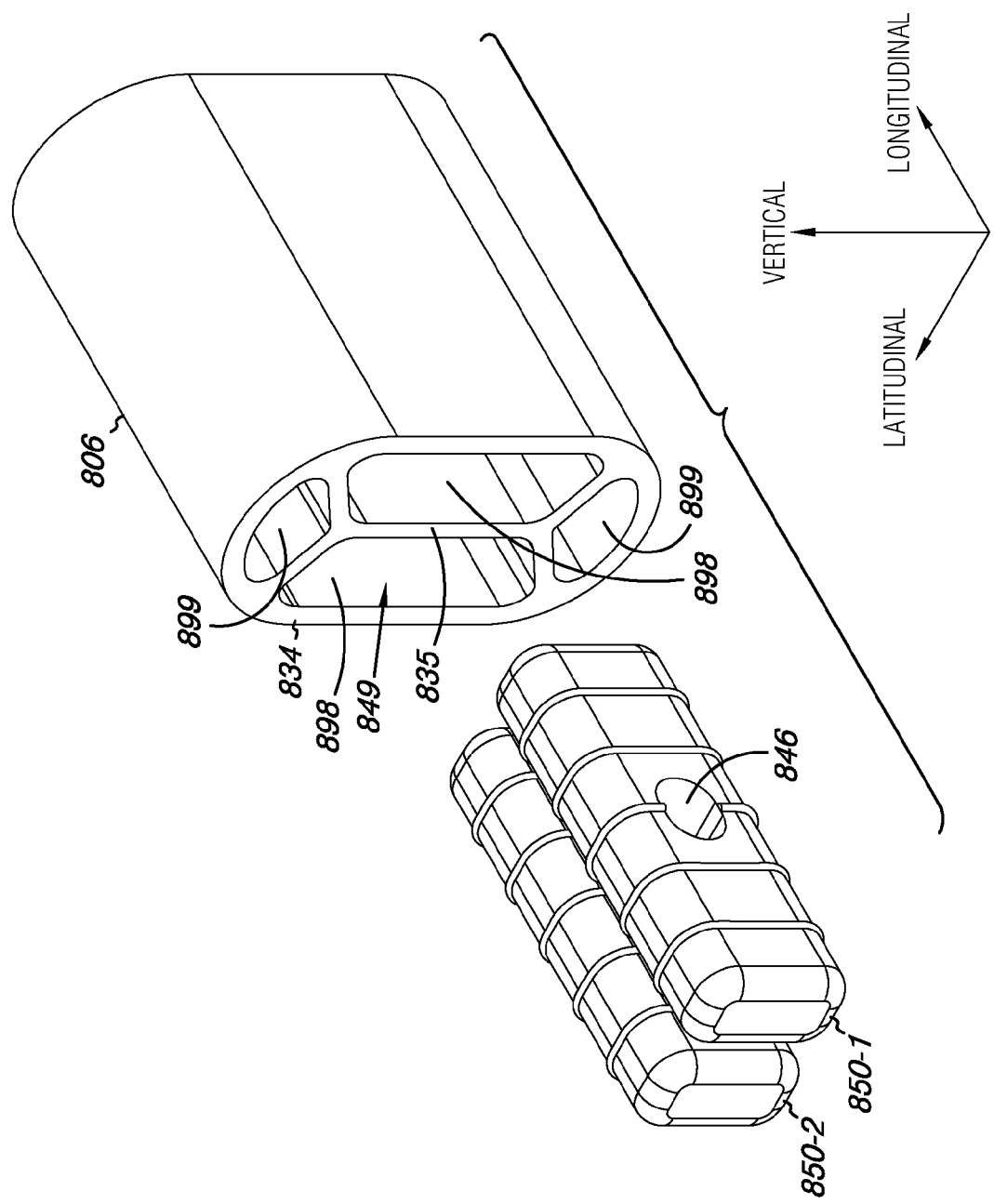
FIG. 8B illustrates internal support bodies for a honeycombed truss member according to one or more embodiments of the present disclosure.

FIG. 8B illustrates internal support bodies 850-1 and 850-2 for a honeycombed truss member according to one or more embodiments of the present disclosure. A particular truss member can be fitted with one or more internal support bodies. The embodiment illustrated in FIG. 8B includes a truss member 806 with a honeycombed interior portion 849 having two major cavities 898 and two minor cavities 899. As such, two internal support bodies 850-1 and 850-2 can be provided to fit within the two major cavities 898. Although the internal support bodies 850-1 and 850-2 are illustrated substantially as described and illustrated in connection with FIG. 8A, other configurations are also possible. For example, the internal support bodies could be geometrically configured to conform to the shape of the cavity in which they are to be fitted, e.g., a generally trapezoidal shape as illustrated for the two major cavities 898 in FIG. 8B.

As described above, the internal support bodies 850-1 and 850-2 can each include an aperture 846 extending vertically through the elongate body of the internal support body. The aperture 846 can be aligned with one or more apertures through latitudinal-vertical planar surfaces of the truss member in which the internal support body is situated, e.g., truss member 806. As such, the truss member 806 can include an aperture (not illustrated) through both outer walls 834 and inner wall 835. As other honeycomb configurations are possible, the aperture can extend through any wall of the honeycombed interior portion 849. A connecting member, e.g., a non-compression sleeve, can pass through the aperture 846 in the internal support body as well as the apertures in the truss member.

The particular interior honeycomb portion 849 illustrated in FIG. 813 may provide greater structural support to the truss member 806 in the vertical direction than in the latitudinal direction. Incorporation of one or more internal support bodies, e.g., internal support bodies 850-1 and 850-2, can provide additional strength to the truss member 806 in the latitudinal direction, e.g., against crushing or bending, among other benefits. In some embodiments, a particular truss member, e.g., truss member 806, may be fitted with one or more internal support bodies, e.g., internal support bodies 850-1 and 850-2, while not being configured with external support, e.g., a layered u-bracket as described herein. Such embodiments may provide additional structural support, e.g., from the one or more internal support bodies, to a truss member, e.g., as formed from steel, without adding the extra weight associated with one or more layered u-brackets.

A collapsible truss assembly has been described herein. One component includes a layered u-bracket including a first u-bracket connected to the collapsible truss assembly, having a first channel, a first surface opposing the channel, and a first aperture that spans from the first surface to the first channel and is of a particular diameter. The layered u-bracket also includes a second u-bracket having a second channel, a second surface opposing the second channel, and a second aperture that spans from the second surface to the second channel and is of the particular diameter. For the layered u-bracket, the second channel is flush with the first surface, and the first and second apertures are aligned.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An assembly, comprising:
   a first truss member;
   a first u-bracket, having a first channel, a first surface opposing the channel, and a first aperture that spans from the first surface to the first channel and is of a first diameter;
   a second u-bracket having a second channel, a second surface opposing the second channel, and a second aperture that spans from the second surface to the second channel and is of the first diameter; and
   a connecting member,
   wherein the first channel is entirely flush with the first truss member, the second channel is flush with the first surface, the first and second apertures are aligned, and the connecting member connects the first u-bracket, the second u-bracket, and the first truss member together, and
   wherein the first u-bracket and second u-bracket are fixedly attached to the first truss member by the connecting member, and wherein the first truss member is part of a pivotal x-joint, which is adapted to include a second truss member, a third u-bracket, and a fourth u-bracket fixedly attached together by the connecting member.

2. The assembly of claim 1, wherein a longitudinal length of the first u-bracket is greater than a longitudinal length of the second u-bracket.

3. The assembly of claim 1, wherein a thicknesses of the first u-bracket is less than or equal to 1.5 millimeters and a thickness of the second u-bracket is less than or equal to two millimeters.

4. The assembly of claim 1, wherein the first u-bracket and second u-bracket support the first truss member, the first u-bracket includes a same material as the truss member, and the second u-bracket includes nylon.

5. The assembly of claim 1, wherein the pivotal x-joint is at a longitudinal midpoint of the truss member and wherein the assembly includes accordion-type truss connections.

6. The assembly of claim 1, wherein the second u-bracket includes an annulus portion that extends perpendicular to the second surface and is defined by an inner wall located a first radial distance from the aperture and an outer wall located a second radial distance from the aperture.

7. The assembly of claim 6, wherein at least one of the inner wall and the outer wall of the annulus portion have a circular geometry.

8. The assembly of claim 7, wherein:
the outer wall of the annulus portion has a circular geometry; and
the inner wall of the annulus portion has a polygonal geometry configured to secure the connecting member having the polygonal geometry.

9. An assembly, comprising:
a first truss member, including a portion of the first truss member having walls formed from a first material;
a second truss member, including a portion of the second truss member having walls formed from the first material;
a first solid internal support body situated within the portion of the first truss member; and
a second solid internal support body situated within the portion of the second truss member, wherein:
the first internal support body includes an outer surface that is substantially flush with inner surfaces of the portion of the first truss member;
the second internal support body includes an outer surface that is substantially flush with inner surfaces of the portion of the second truss member;
the first internal support body includes a first number of ribs surrounding a latitudinal-vertical plane of an exterior of the first internal support body;
the second internal support body includes a second number of ribs surrounding a latitudinal-vertical plane of an exterior of the second internal support body;
the first and second internal support bodies are formed from a second material; and
the first and second truss members and the first and second internal support bodies are attached together in an x-joint configuration by a connecting member passing through a first aperture and a second aperture in the first truss member, a third aperture and fourth aperture in the second truss member, a fifth aperture in the first internal support body, and a sixth aperture in the second internal support body.

10. The assembly of claim 9, wherein the first material is aluminum and the second material is nylon.

11. The assembly of claim 9, wherein the connecting member passes through, in order:
a first wall of the first truss member;
the first elongate body;
a second wall of the first truss member;
a first wall of the second truss member;
the second elongate body; and
a second wall of the second truss member.

12. The assembly of claim 9, wherein the first number of ribs include the outer surface of the first internal support body that is substantially flush with inner surfaces of the portion of the first truss member and the second number of ribs include the outer surface of the second internal support body that is substantially flush with inner surfaces of the portion of the second truss member.

* * * * *